United States Patent [19]

Kobsa et al.

[11] Patent Number: 5,227,128
[45] Date of Patent: Jul. 13, 1993

[54] REACTIVITY CONTROLLED FUEL ASSEMBLY

[75] Inventors: Irvin R. Kobsa; Harold E. Townsend; Russell M. Fawcett, all of San Jose, Calif.

[73] Assignee: General Electric Company, San Jose, Calif.

[21] Appl. No.: 935,325

[22] Filed: Aug. 26, 1992

[51] Int. Cl.$^5$ .............................................. G21C 7/22
[52] U.S. Cl. ............................... 376/328; 376/446; 376/447
[58] Field of Search ................. 376/328, 330, 446, 447

[56] References Cited

U.S. PATENT DOCUMENTS

| | | |
|---|---|---|
| 2,990,358 | 6/1961 | Manley . |
| 3,261,755 | 7/1966 | Mostert ............................ 376/330 |
| 3,510,399 | 5/1970 | Terasawa et al. . |
| 3,629,068 | 12/1971 | Lantz et al. . |
| 4,664,878 | 5/1987 | Wilson et al. ..................... 376/328 |
| 5,139,735 | 8/1992 | Dillmann ........................... 376/328 |

OTHER PUBLICATIONS

General Electric Co., "BWR/6 General Description of a Boiling Water Reactor," Sep. 1980, pp: i, ii, 1—1 to 1–6, and 3–1 to 3–8.

Primary Examiner—Daniel D. Wasil
Attorney, Agent, or Firm—John S. Beulick

[57] ABSTRACT

A reactor core removable fuel assembly includes upper and lower tie plates having pluralities of fuel rods and hollow control rods extending therebetween. The lower tie plate includes a lower manifold therein joined in flow communication with a reservoir containing a neutron absorbing control liquid, with the reservoir being removable from the reactor core together with the fuel assembly. The control liquid is selectively pumped from the reservoir through the lower manifold and into the control rods for selectively varying the level of the control liquid therein for controlling reactivity.

10 Claims, 5 Drawing Sheets

REACTIVITY CONTROLLED FUEL ASSEMBLY

The present invention relates generally to nuclear reactors, and, more specifically, to an assembly for controlling nuclear reactivity in a fuel bundle.

BACKGROUND OF THE INVENTION

In a nuclear reactor such as a boiling water reactor (BWR), a reactor core containing nuclear fuel rods is provided for heating water to be used as a power source for a steam turbine-generator, for example. The fuel rods are typically grouped together in fuel bundles or assemblies, having a square matrix for example, with upper and lower tie plates being used to maintain a predetermined lateral spacing between the adjacent fuel rods.

In the BWR, a recirculating coolant, or water, is suitably channeled through the lower tie plate and upwardly between the fuel rods for cooling the fuel rods during operation, with the coolant having an increasing steam void fraction as it rises upwardly along the fuel rods with the resulting liberated steam being suitably channeled to the steam turbine.

In order to control reactivity of the fuel rods, conventional solid control rods are selectively translatable upwardly and downwardly between the fuel rods for selectively absorbing neutrons emitted therefrom during operation. The control rods may be in the conventional form of a cruciform disposed between adjacent fuel bundles, or may be in the form of a plurality of finger-type rods insertable in the fuel bundles between selected fuel rods thereof. In both examples, suitable control rod drives (CRDs) are also provided which may be located below the lower head of the pressure vessel or above the upper head of the pressure vessel depending upon the particular design. In both designs, however, the CRDs are disposed outside the pressure vessel and require suitable penetrations of the pressure vessel for the translatable plungers thereof to translate the control rods.

Concepts for controlling reactivity of the reactor core using a liquid neutron absorber in hollow tubes are known in the literature, with the level of the liquid absorber being selectively varied. This is analogous to the degree of insertion of the solid control rods into the reactor core. However, a liquid neutron absorber reactivity control system has practical problems associated with the installation of the required many tubes and reservoirs for the liquid absorber in the pressure vessel. Furthermore, the ability to replace components of such a system is also required which imposes even further practical problems for dealing with the substantial number of tubes and connections therebetween which require individual replacement with suitable leak tight connections. The liquid absorber must also be suitably separated from the circulating coolant in the reactor core to prevent the adulteration thereof which would adversely affect operation of the reactor core.

SUMMARY OF THE INVENTION

A reactor core removable fuel assembly includes upper and lower tie plates having pluralities of fuel rods and hollow control rods extending therebetween. The lower tie plate includes a lower manifold therein joined in flow communication with a reservoir containing a neutron absorbing control liquid, with the reservoir being removable from the reactor core together with the fuel assembly. The control liquid is selectively pumped from the reservoir through the lower manifold and into the control rods for selectively varying the level of the control liquid therein for controlling reactivity.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
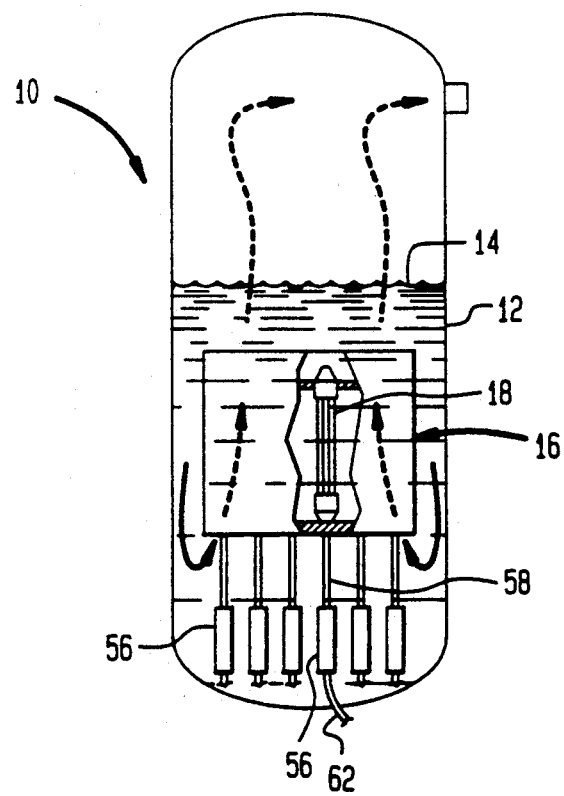
FIG. 1 is a schematic elevation view of an exemplary boiling water reactor having a reactor core containing an improved fuel assembly in accordance with one embodiment of the present invention.

Illustrated schematically in FIG. 1 is an exemplary boiling water reactor (BWR) 10 which includes a reactor pressure vessel 12 partially filled with a liquid coolant, or water, 14 which is suitably recirculated through the pressure vessel 12 and upwardly through a reactor core 16 therein. The core 16 includes a plurality of vertically extending fuel assemblies or bundles 18 which are conventionally effective for the heating coolant 14 to generate steam which is discharged from the pressure vessel 12 for powering a conventional steam turbine-generator (not shown), for example.

Figure 3:
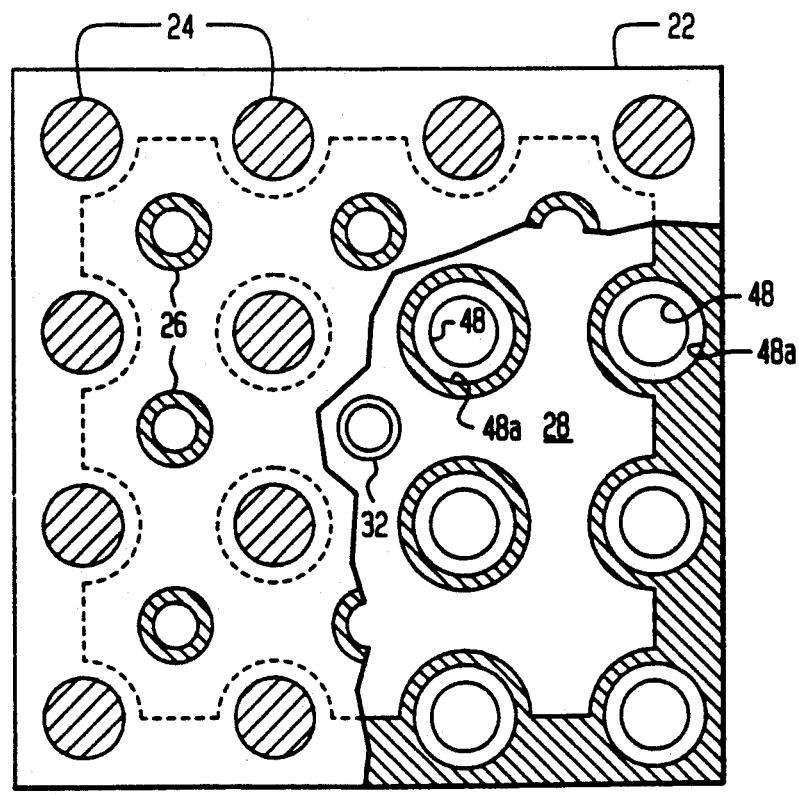
FIG. 3 is a transverse, partly sectional view of the fuel bundle illustrated in FIG. 2 taken along line 3—3.
Figure 2:
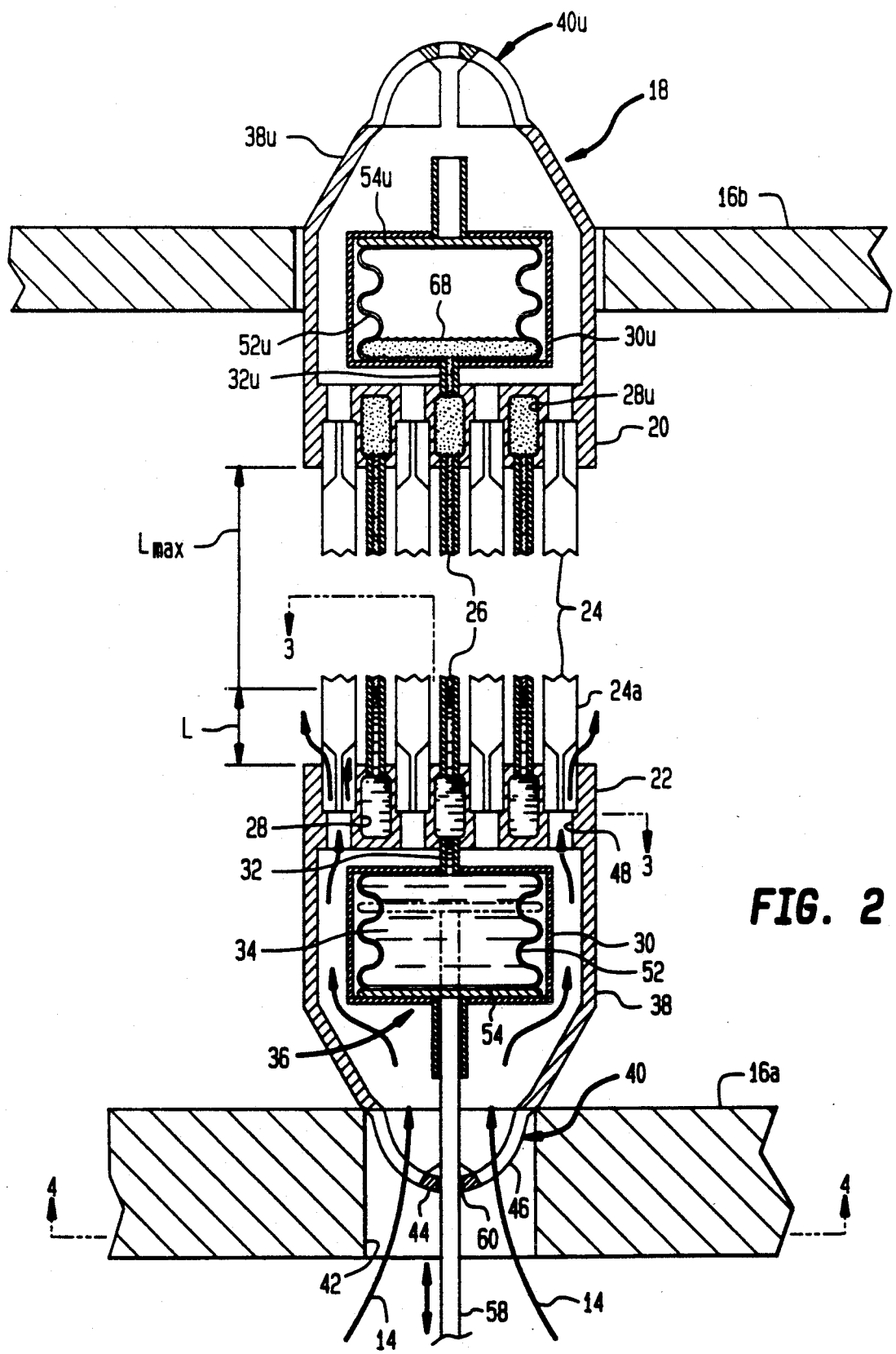
FIG. 2 is an enlarged, elevation, partly sectional view of one of the fuel assemblies disposed in the core of FIG. 1.

As shown in more particularity in FIGS. 2 and 3, each of the fuel assemblies 18 includes a first, or upper tie plate 20 spaced vertically or longitudinally from a second, or lower tie plate 22, and parallel thereto. In this exemplary embodiment, the tie plates 20, 22 are generally square in configuration and support therebetween a plurality of laterally spaced apart nuclear fuel rods 24 which extend longitudinally therebetween and are joined thereto. As shown in FIG. 3, the fuel rods 24 are disposed in a conventional 4×4 matrix for example, with any other suitable matrix also being usable. In accordance with one feature of the present invention, a plurality of laterally spaced apart hollow control rods or tubes 26 extend longitudinally between the upper and lower tie plates 20, 22 and are joined thereto as described in more detail below. As shown in FIG. 3, the control rods 26 are laterally spaced apart from each other in a 3×3 matrix, for example with each control rod 26 being disposed equidistantly at the center between four adjacent ones of the fuel rods 24. The number of control rods 26 and their spacing in the fuel bundle 18 may be conventionally selected for suitably shaping the reactivity of the fuel rods 24 during operation.

The lower tie plate 22 includes a lower manifold 28 therein which is suitably joined in flow communication with all of the control rods 26 at their lower ends. A generally closed reservoir 30 is disposed below the lower tie plate 22 and fixedly joined thereto in flow communication with the lower manifold 28 by a transfer tube 32 and contains a conventional neutron absorbing control liquid 34. The reservoir 30 is fixedly joined at its upper end to the lower tie plate 22 by the transfer tube 32 so that it is removable from the reactor core 16 as a unit together with the fuel assembly 18 when the fuel assembly 18 is removed therefrom.

Means shown generally at 36 are provided for pumping the control liquid 34 from the reservoir 30 through the lower manifold 28 and into the control rods 26 for selectively varying the level L of the control liquid 34 in the control rods 26 for correspondingly varying the reactivity of the fuel rods 24. The control liquid 34 may be any conventional neutron absorber or poison such as mercury or sodium pentaborate in a water solution which is effective for absorbing neutrons from the fuel rods 24 during operation in substantially the same manner as conventional solid control rods. By varying the level L of the control liquid 34 in the several control rods 26 simultaneously, a maximum amount of neutrons may be absorbed by the control liquid 34 as it fills the control rods 26 to a maximum level $L_{max}$ at about the same elevation as the top of the fuel rods 24, and a minimum amount, or substantially no neutrons are absorbed, when the level L is lowered down to the lower tie plate 22 at the bottom ends of the fuel rods 24. The level L of the control liquid 24 may also be selectively disposed at intermediate positions therebetween as desired. In this way, the level L of the control liquid 34 is used to control reactivity of the fuel rods 24 in a manner similar to the amount of insertion of conventional solid control rods in a nuclear reactor core.

A significant advantage of the present invention is that the fuel assembly 18 includes a closed system for the control liquid 34 as an integral part thereof so that each individual fuel assembly 18 may be separately removed from the reactor core 16 as required for replacement or reversal as described in more detail below. Since the control liquid 34 is contained in such a closed system, additional piping or connections are not required for its operation, and, therefore, they need not be disassembled in order to allow the fuel assembly 18 to be removed from the core 16.

Figure 4:
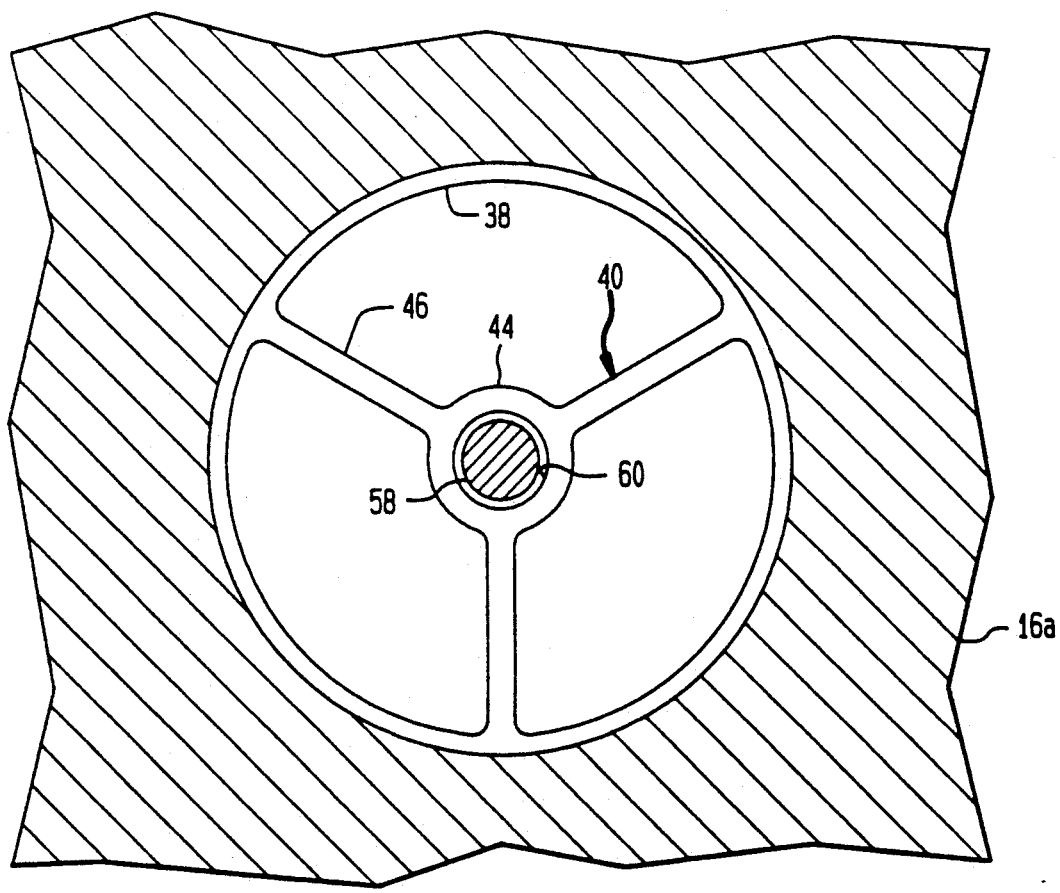
FIG. 4 is a transverse, partly sectional view of a portion of the lower tie plate supporting a lower nosepiece of the fuel bundle illustrated in FIG. 2 taken along line 4—4.

As shown in FIG. 2, the fuel assembly 18 preferably further includes a lower housing 38 fixedly or interrally joined to the lower tie plate 22 and surrounding the reservoir 30. The housing 38 extends downwardly from the lower tie plate 22 and past the reservoir 30, and includes a lower nosepiece 40 for channeling the coolant 14 into the lower housing 38 and around the reservoir 30. As shown in FIGS. 2 and 4, the lower nosepiece 40 is generally conical in configuration and is sized for insertion into a complementary aperture or seat 42 extending vertically through a lower core plate 16a of the reactor core 16 which is disposed at the bottom of the core 16 below an upper core plate 16b disposed at the top of the core 16. As shown in more particularity in FIG. 4, the lower nosepiece 40 includes a central hub 44 having three equiangularly spaced apart spokes or ribs 46 extending outwardly therefrom which are integrally formed with the lower housing 38. The spaced apart ribs 46 allow the coolant 14 to enter the lower nosepiece 40 through the seat 42 for flow upwardly inside the lower housing 38.

Figure 6:
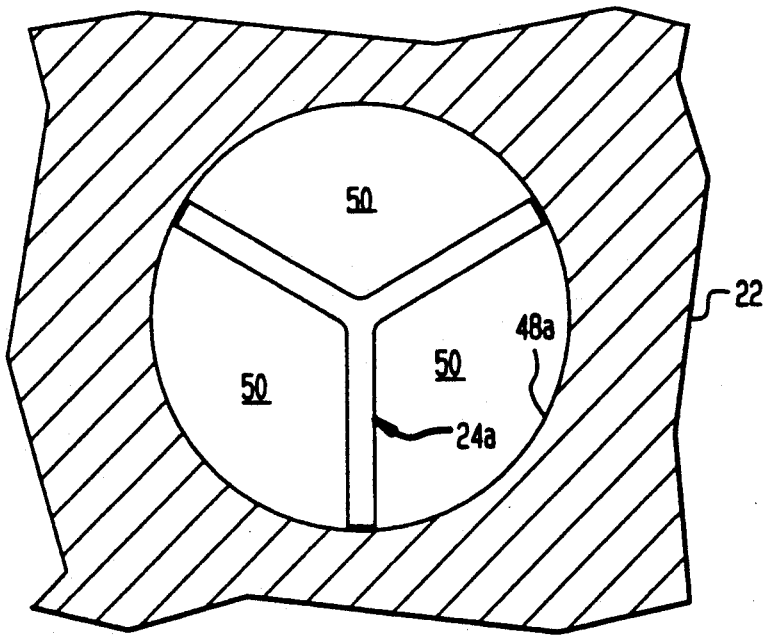
FIG. 6 is a transverse, partly sectional view of a portion of the lower tie plate illustrated in FIG. 5 taken along line 6—6 showing a bottom end of one of the fuel rods.
Figure 5:
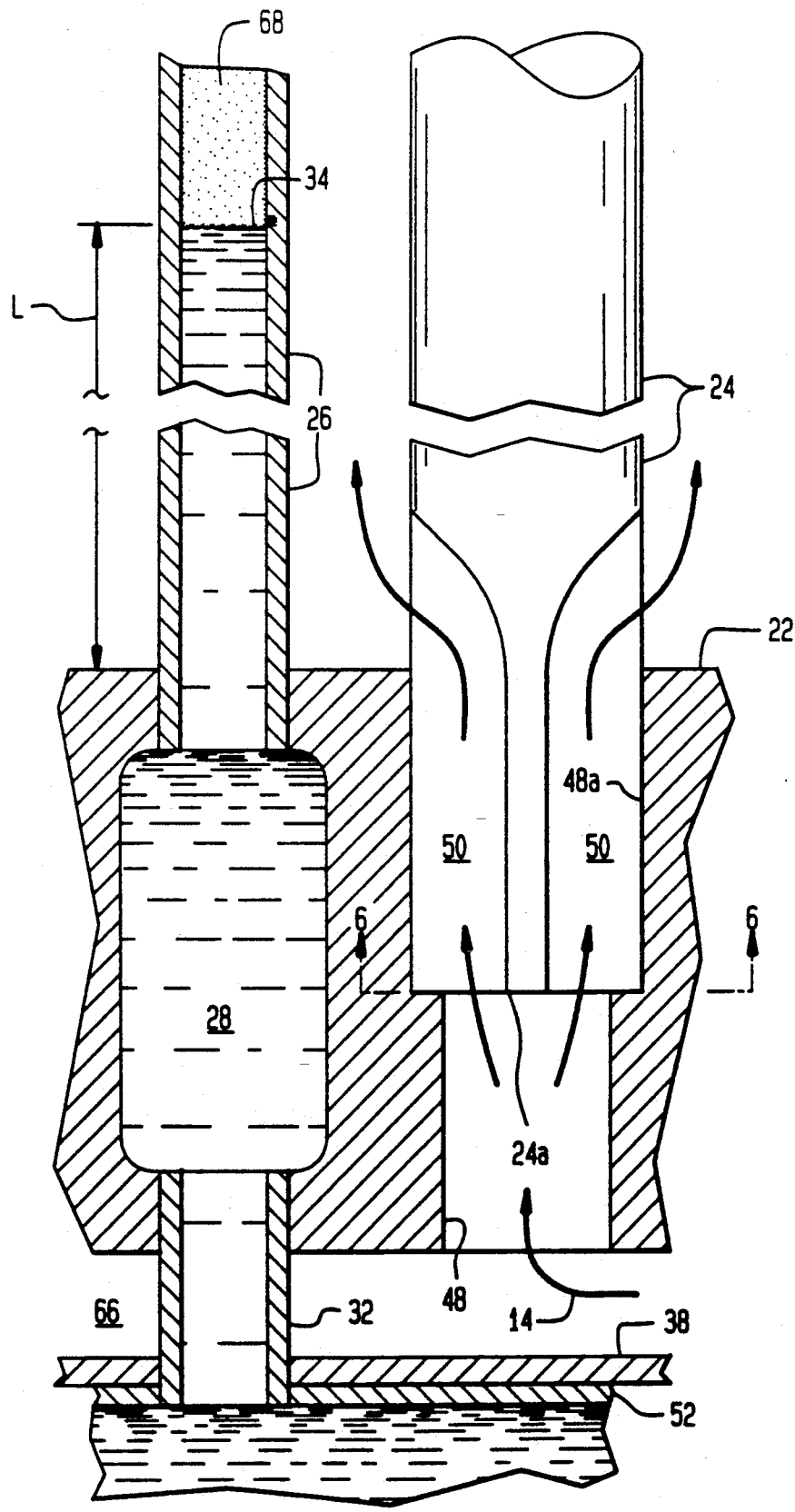
FIG. 5 is an enlarged, elevation, partly sectional view of a portion of the fuel assembly illustrated in FIG. 2 showing the bottom end of an adjacent fuel rod and control rod in the lower tie plate.

The lower tie plate 22 as shown in FIGS. 2 and 5 includes a plurality of laterally spaced apart inlets 48 extending therethrough at respective ones of the fuel rods 24, and disposed in flow communication with the inside of the housing 38 for channeling the coolant 14 received from the lower nosepiece 40 through the lower tie plate 22 and upwardly therefrom along the several fuel rods 24. The coolant 14 is, therefore, allowed to flow upwardly through the lower tie plate 22 and around each of the fuel rods 24 to provide cooling thereof. As shown in more particularity in FIGS. 5 and 6, each of the inlets 48 includes an enlarged portion, or counterbore 48a into which the lower end 24a of an individual fuel rod 24 may be seated. In order to allow the coolant 14 to flow upwardly through the inlet 48 and past the fuel rod lower end 24a, the lower end 24a includes three radially extending and equiangularly spaced apart grooves 50 which extend therein longitudinally through the counterbore 48a and suitably upwardly therepast for providing a continuous flowpath upwardly through the lower tie plate 22 for channeling the coolant 14.

Accordingly, the lower tie plate 22 has a generally checkerboard configuration for mounting the spaced apart fuel rods 24, while allowing the lower manifold 28 to extend between adjacent fuel rods 24 for channeling the control liquid 34 to the spaced apart control rods 26 also mounted thereto. This is best shown in FIG. 3, and may be manufactured using conventional casting techniques.

Figure 7:
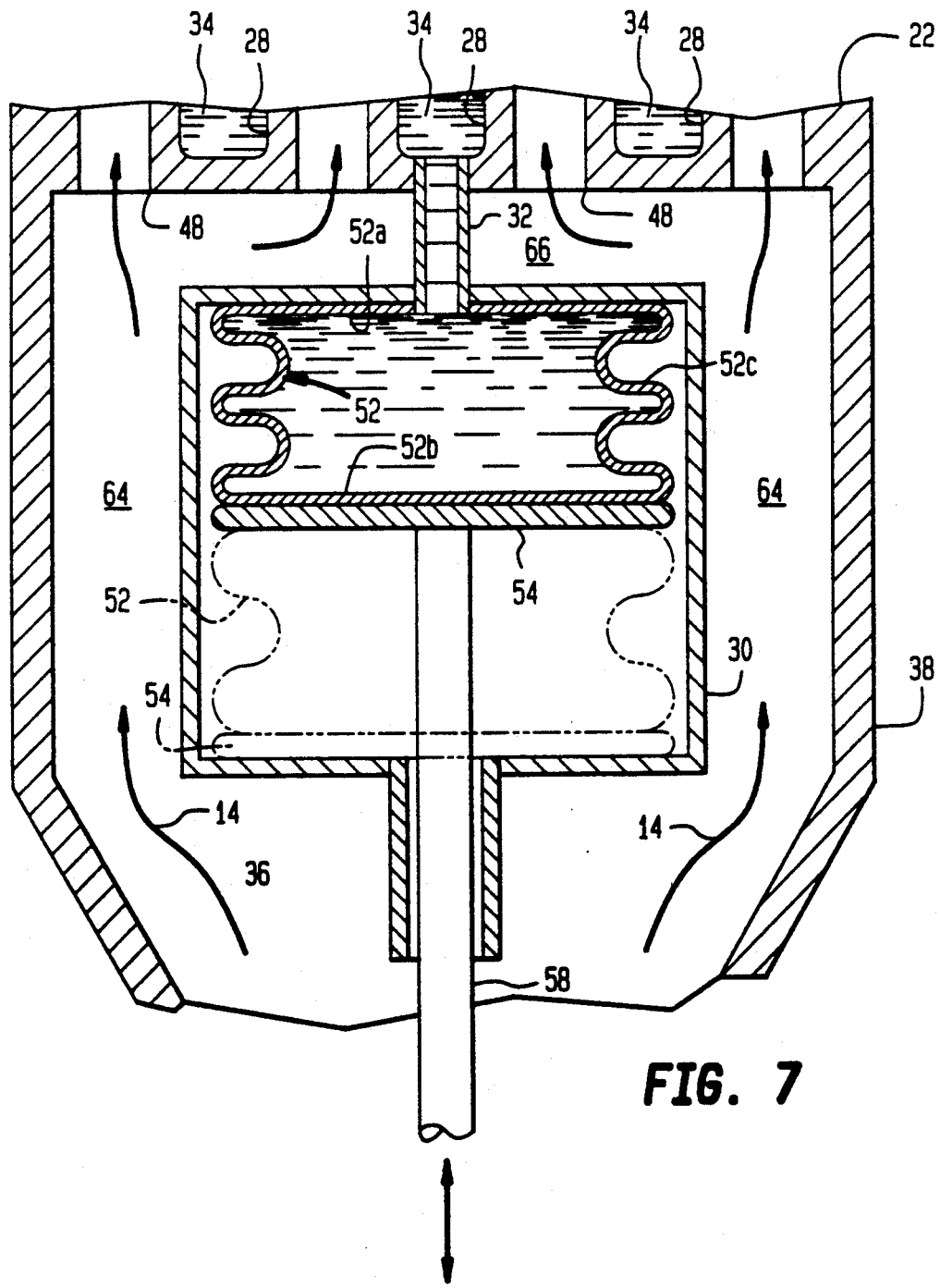
FIG. 7 is an enlarged, elevation, partly sectional view of the lower portion of the fuel assembly illustrated in FIG. 2 showing in more particularity a compressible bellows.

In order to effectively seal the control liquid 34 within the housing 30 while allowing pumping thereof, a conventional, metal lower bellows 52 is disposed inside the reservoir 30 as shown in more particularity in FIG. 7 in flow communication with the lower manifold 28. The lower bellows 52 includes a flat top 52a disposed against the inside surface of the top of the reservoir 30 and in flow communication with the transfer tube 32 by being suitably welded thereto, for example. The bellows 52 further includes a flat, imperforate bottom 52b spaced below the top 52a, and a corrugated, annular side wall 52c which is also imperforate and extends integrally between the bellows top 52a and bottom 52b for containing the control liquid 34 therein without leaking therefrom upon elastic compression of the bellows side wall 52c during operation.

More specifically, the bellows 52 is suitably compressed for pumping the control liquid 34 upwardly through the transfer tube 32 and into the lower manifold 28 for raising the level L of the control liquid 34 in the control rods 26. The bellows 52 may be compressed by any suitable means including pneumatic or hydraulic pressure, or by a suitable driven piston 54 disposed inside the reservoir 30 and adjacent to the bellows 52 as shown in the exemplary embodiment illustrated in FIG. 7. The piston 54 is selectively translatable upwardly, inside the reservoir 30 for selectively compressing the bellows 52 to pump the control liquid 34 into the lower manifold 28, or downwardly for allowing the bellows 52 to uncompress for allowing gravity to return the control liquid 34 back into the bellows 52 within the reservoir 30.

Referring to FIGS. 1, 2 and 7, the pumping means 36 in this exemplary embodiment includes a conventional actuator 56 having a selectively extendable, elongate plunger or rod 58 positionable through an aperture 60 in the lower nosepiece 40 and into the reservoir 30, and joined to the piston 54 in abutting contact therewith, for example. Alternatively, the rod 58 may be fixedly joined to the piston 54. As shown in phantom in FIG. 7, when the plunger 58 is fully withdrawn, the piston 54 is disposed at the bottom of the reservoir 30, and the bellows 52 is uncompressed and has its maximum volume which receives the control liquid 34 from all of the several control rods 26 to lower the control liquid 34 to its minimum level. In order to raise the level L of the control liquid 34 in the control rod 26, the actuator 56 is actuated for extending the plunger 58 upwardly inside the reservoir 30 for translating upwardly the piston 54 as shown in solid line in FIG. 7 to selectively compress the lower bellows 52 to pump the control liquid 34 into the control rods 26 to correspondingly raise the level L thereof. The actuator 56 may be any conventional actuator powered pneumatically, hydraulically, or electrically for suitably extending and retracting the plunger 58. The actuators 56 as shown in FIG. 1 are preferably disposed entirely inside the reactor pressure vessel 12 below the reactor core 16, with the only penetration of the pressure vessel 12 being suitable conduits 62 for powering the actuators 56. The seals therefore required for the conduits 62 extending through the pressure vessel 12 are simpler than those which would be required for sealing the translatable plunger 58 if the actuators 56 were instead mounted outside the pressure vessel 12 below the lower head thereof.

Referring again to FIG. 7, the reservoir 30 is preferably spaced radially inwardly from the side wall of the housing 38 to define therebetween an annular metering orifice 64 for suitably metering flow of the coolant 14 from the lower nosepiece 40 and to the lower tie plate inlets 48. Furthermore, the reservoir 30 is spaced longitudinally below the lower tie plate 22 to define therebetween an access channel 66 for allowing the coolant 14 to flow upwardly from the metering orifice 64 around the reservoir 30 and into the lower tie plate inlets 48. The transfer tube 32 allows the reservoir 30 to be spaced from the lower tie plate 22 while still providing flow communication between the lower bellows 52 and the lower manifold 28 for channeling the control liquid 34 therebetween.

Referring again to FIG. 2, each of the fuel assemblies 18 is preferably top-and-bottom symmetrical as shown for being functionally reversible in the reactor core 16 so that after an initial burn cycle of the fuel rods 24, the fuel bundles 18 may be removed from the core 16, turned upside down and reinstalled into the core 16 for further operation for another portion of the burn cycle. By configuring the fuel bundles 18 to be symmetrical, the control liquid 34 in the control rods 26 may be identically varied. More specifically, the upper tie plate 20 is configured identically to the lower tie plate 22 and similarly includes an upper manifold 28u joined in flow communication with an upper reservoir 30u through an upper transfer tube 32u. Disposed inside the upper reservoir 30u is a corresponding upper bellows 52u, with a corresponding upper piston 54u being disposed thereabove. An upper housing 38u surrounds the upper reservoir 30u and is formed integrally with the upper tie plate 20, and includes an upper nosepiece 40u extending upwardly therefrom. The upper nosepiece 40u may serve as the lifting bail for withdrawing from and inserting into the reactor core 16 the fuel assembly 18.

The fuel assembly 18 need not be top-and-bottom symmetrical with the upper bellows 52u and related components, but may have the control rods 26 simply ending in the upper tie plates 20. The control rods 26 may be simply initially evacuated, to allow the level L of the control liquid 34 to be selectively varied within the control rods 26. Alternatively, the control rods 26 may include a conventional inert gas such as nitrogen which is compressed into the tops of the control rods 26 as the control fluid 34 is pumped into the control rods 26.

As shown in FIG. 2, the symmetrical fuel assembly 18 may be similarly operated with either the upper bellows 52u being evacuated, or containing an inert gas, and being effective for providing a reservoir for containing excess control fluid 34 pumped upwardly therein upon compression of the lower bellows 52. In the exemplary embodiment illustrated in FIG. 2, the control rods 26 preferably include a non-neutron absorbing displacable fluid 68 which is displacable upwardly from the control rods 26 as the control liquid 34 is pumped therein. As described above, the displacable fluid 68 may be an inert gas such as nitrogen, or a gas moderator such as hydrogen or ammonia, or preferably a liquid nuclear moderator such as water or Deuterium based water. For the displacable fluid 68 in liquid form illustrated in FIG. 2, it is preferably immiscible with the control liquid 34 to prevent the mixing thereof and ensure the proper functioning of the control liquid 34. As a liquid moderator, the displacing fluid 68 is effective for moderating neutrons emitted from the fuel rods 26 for slowing the neutrons to thermal neutron energy levels for increasing reactivity of the core 16. Accordingly, with the control liquid 34 pumped into the control rods 26, neutrons from the fuel rods 24 will be absorbed, whereas when the control liquid 34 is removed from the control rods 26 and replaced by the liquid moderator 68, the neutrons from the fuel rods 24 will be slowed and thus moderated. The upper bellows 52u, therefore, is effective for storing the liquid moderator 68 upon displacement thereof from the control rods 26 by the control liquid 34 pumped therein.

Accordingly, a completely contained closed system for the control liquid 34 is provided in each fuel assembly 18. The control rods 26 are arranged in a suitable between the fuel rods 24 to distribute the neutron absorbing control liquid 34 in the most efficient manner to avoid flux peaking in the fuel rods 24 and approach the ideal condition of completely homogeneous distribution.

Furthermore, the control rods 26 are suitably and permanently sealed, by welding for example, into the lower and upper manifolds 28, 28u at both ends thereof, and are integral with the upper and lower tie plates 20, 22 in the preferred embodiment. The control liquid containment system is, therefore, removable along with each fuel assembly 18 without the need to disconnect any fluid carrying conduits thereto. The components for carrying the control liquid 34 may be made of any suitable and conventional material such as Zircaloy, stainless steel and/or inconel, which have material properties suitable for the lifetime of a fuel assembly in the nuclear reactor 10.

Suitable techniques may be used to ensure that the bellows 52, 52u and the control rods 26 have not ruptured and developed leaks. For example, periodic sampling of the coolant 14 may be performed to test for any leaking control liquid 34. Alternatively, a reduction in the mechanical load required to displace the lower bellows 52 upwardly may be used to infer a rupture of the lower bellows 52 or significant leak of the control liquid 34 from the system since resistance to translation upwardly of the bellows 52 in a normal system increases relative thereto.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A fuel assembly removably positionable in a reactor core inside a pressure vessel of a nuclear reactor comprising:
   an upper tie plate;
   a lower tie plate spaced from said upper tie plate, and including a lower manifold therein;
   a plurality of laterally spaced apart fuel rods extending longitudinally between said upper and lower tie plates and joined thereto;
   a plurality of laterally spaced apart hollow control rods extending longitudinally between said upper and lower tie plates and joined in flow communication with said lower manifold;
   a reservoir containing a neutron absorbing control liquid joined to said lower tie plate in flow communication with said lower manifold, and being removable together with said fuel assembly when said fuel assembly is removed from said reactor core; and
   means for pumping said control liquid from said reservoir through said lower manifold and into said control rods for selectively varying the level of said control liquid in said control rods.

2. A fuel assembly according to claim 1 further comprising:
   a lower housing fixedly joined to said lower tie plate and surrounding said reservoir, and including a lower nosepiece for channeling a liquid coolant into said lower housing and around said reservoir; and
   wherein said lower tie plate includes a plurality of inlets extending therethrough at respective ones of said fuel rods, and disposed in flow communication with said lower housing for channeling said coolant through said lower tie plate and along said fuel rods.

3. A fuel assembly according to claim 2 further comprising:
   a lower bellows disposed inside said reservoir in flow communication with said lower manifold, said lower bellows containing said control liquid; and
   wherein said pumping means include a piston disposed inside said reservoir and adjacent to said lower bellows, said piston being selectively translatable inside said reservoir for selectively compressing said lower bellows to pump said control liquid into said lower manifold and said control rods for varying said control liquid level.

4. A fuel assembly according to claim 3 wherein said reservoir is spaced radially inwardly from said lower housing to define an annular orifice for metering flow of said coolant through said lower tie plate inlets.

5. A fuel assembly according to claim 4 wherein:
   said reservoir is spaced longitudinally from said lower tie plate to define an access channel for allowing said coolant to flow from said metering orifice around said reservoir and into said lower tie plate inlets; and
   further comprising a transfer tube extending between said lower tie plate and said reservoir and disposed in flow communication between said lower manifold and said lower bellows for channeling said control liquid therebetween.

6. A fuel assembly according to claim 5 being top-and-bottom symmetrical for being reversible in said reactor core and including an upper manifold in said upper tie plate in flow communication with said control rods, and an upper bellows in flow communication with said upper manifold.

7. A fuel assembly according to claim 6 wherein said control rods include a non-neutron absorbing fluid being displacable from said control rods as said control liquid is pumped therein.

8. A fuel assembly according to claim 7 wherein said displacable fluid is a liquid being immiscible with said control liquid and effective for moderating neutrons emitted from said fuel rods, said upper bellows being effective for storing said liquid moderator upon displacement thereof from said control rods by said control liquid pumped therein.

9. A fuel assembly according to claim 6 wherein said pumping means further include:
   an actuator having a selectively extendable plunger positionable through said lower nosepiece and into said reservoir for translating said piston to selectively compress said lower bellows to pump said control liquid into said control rods to raise said level thereof.

10. A fuel assembly according to claim 9 wherein said actuator is disposed inside said reactor pressure vessel below said reactor core.

* * * * *